(12) United States Patent
Carlton et al.

(10) Patent No.: US 8,138,874 B1
(45) Date of Patent: Mar. 20, 2012

(54) NANOMAGNETIC REGISTER

(75) Inventors: David Carlton, Berkeley, CA (US);
Nathan C. Emley, Oakland, CA (US);
Jeffrey Bokor, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 347 days.

(21) Appl. No.: 12/505,898

(22) Filed: Jul. 20, 2009

(51) Int. Cl.
*H01F 7/02* (2006.01)
*H01F 1/00* (2006.01)

(52) U.S. Cl. ........ 335/306; 335/209; 335/219; 335/284; 335/302; 335/303; 335/304; 29/607; 977/838; 977/960

(58) Field of Classification Search .................. 335/209, 335/219, 284, 285, 302–306; 29/607; 977/838, 977/960
See application file for complete search history.

(56) References Cited

U.S. PATENT DOCUMENTS

| | | |
|---|---|---|
| 6,614,084 B1 | 9/2003 | Cowburn et al. |
| 6,774,391 B1 | 8/2004 | Cowburn |
| 6,867,988 B2 | 3/2005 | Cowburn |
| 7,120,049 B2 | 10/2006 | Nakamura et al. |
| 7,126,848 B2 | 10/2006 | Nakamura et al. |
| 7,175,778 B1 | 2/2007 | Bhargava et al. |
| 7,644,489 B2 | 1/2010 | Arora et al. |
| 2004/0027899 A1 | 2/2004 | Cowburn |
| 2006/0091914 A1 | 5/2006 | Bourianoff et al. |
| 2006/0222896 A1 | 10/2006 | Inomata |
| 2007/0054154 A1 | 3/2007 | Leu |
| 2007/0183188 A1 | 8/2007 | Kim et al. |

OTHER PUBLICATIONS

Office Action mailed Mar. 30, 2011 for U.S. Appl. No. 12/131,669.
Alam, M. T. et al., "Clocking Scheme for Nanomagnet QCA," Proceedings of the 7th IEEE International Conference on Nanotechnology, Aug. 2-5, 2007, Hong Kong, pp. 403-408.
Behin-Aein, B. et al., "Switching Energy of Ferromagnetic Logic Bits," arXiv:0804.1389, Apr. 9, 2008.
Berling, P. et al., "Magnetization Reversal Mechanisms in Epitaxial FE/SI(0 0 1) Layers with Twofold and Fourfold Magnetic Anisotropies," Journal of Magnetism and Magnetic Materials, 2001, vol. 237, pp. 181-190, Elsevier Science B.V.
Bernstein, G.H. et al., "Magnetic QCA Systems," Microelectronics Journal, available online May 31, 2005, vol. 36, pp. 619-624.
Cowburn, R. P. et al., "Probing Antiferromagnetic Coupling Between Nanomagnets," Physical Review B, The American Physical Society, Feb. 13, 2002, vol. 65, No. 9, pp. 1-4.
Cowburn, R. P. et al., "Room Temperature Magnetic Quantum Cellular Automata," Science, Feb. 2000, vol. 287, pp. 1466-1468.
Csaba, G. et al., "Power Dissipation in Nanomagnetic Logic Devices," 4th IEEE Conference on Nanotechnology, 2004, pp. 346-348.
Csaba, G. et al., "Nanocomputing by Field-Coupled Nanomagnets," IEEE Transactions on Nanotechnology, Dec. 2002, vol. 1, No. 4, pp. 209-213.

(Continued)

*Primary Examiner* — Mohamad Musleh
(74) *Attorney, Agent, or Firm* — Withrow & Terranova, P.L.L.C.

(57) ABSTRACT

A nanomagnetic flip-flop, or register. The nanomagnetic register receives a signal from an input signal nanomagnet on a first clock cycle, and provides the input to an output signal nanomagnet on a second clock cycle. The input signal nanomagnet and the output signal nanomagnet are arranged on a substrate. Each of the signal nanomagnets has an easy axis and a hard axis that are substantially in a signal plane. A register nanomagnet is arranged on the substrate between the input signal nanomagnet and the output signal nanomagnet. The register nanomagnet has an easy axis and a hard axis that are substantially in a register plane. The register plane is not coplanar with the signal plane.

22 Claims, 8 Drawing Sheets

OTHER PUBLICATIONS

Csaba, G. et al.,"Simulation of Power Gain and Dissipation in Field-Coupled Nanomagnets," Journal of Computational Electronics, 2005, vol. 4, pp. 105-110.

Imre, G. et al., "Investigation of Shape-Dependent Switching of Coupled Nanomagnets," Superlattices and Microstructures, 2003, vol. 34, pp. 513-518.

Imre, G. et al., "Majority Logic Gate for Magnetic Quantum-Dot Cellular Automata," Science, Jan. 2006, vol. 311, pp. 205-208.

Kowalewski, M. et al., "Thickness and Temperature-Dependence of Magnetic Anisotropies in Ultrathin fcc Co (001) Structures," Physical Review B, The American Physical Society, Apr. 1993, vol. 47, No. 14, pp. 8748-8753.

Lee, F.S., "Shape-Induced Biaxial Anisotropy in Thin Magnetic Films," IEEE Transactions on Magnetics, Sep. 1968, vol. Mag-4, No. 3, pp. 502-506, IEEE.

Niemier, M. et al., "Clocking Structures and Power Analysis for Nanomagnet-Based Logic Devices," Proceedings of the 2007 International Symposium on Low Power Electronics and Design, Aug. 27-29, 2007, Portland, OR, USA: ACM, 2007, pp. 26-31.

Niemier, M. et al., "Bridging the Gap Between Nanomagnetic Devices and Circuits," IEEE International Conference on Computer Design (ICCD), Oct. 12, 2008, pp. 506-513.

Nikonov, D. E. et al., "Simulation of Highly Idealized, Atomic Scale Magnetic Quantum Cellular Automata Logic Circuits," Journal of Nanoelectronics and Optoelectronics, Mar. 2008, vol. 3, No. 1, pp. 3-11.

Parish, M. C. B. et al., "Physical Constraints on Magnetic Quantum Cellular Automata," Applied Physics Letters, Sep. 8, 2003, vol. 83, No. 10, pp. 2046-2048.

Yang, T. et al., "Giant Spin-Accumulation Signal and Pure Spin-Current-Induced Reversible Magnetization Switching," Nature Physics, Nov. 2008, vol. 4, pp. 851-854.

Notice of Allowance mailed Aug. 31, 2011, for U.S. Appl. No. 12/131,669, 9 pages.

NANOMAGNETIC REGISTER

FIELD OF THE INVENTION

This invention generally relates to nanomagnetic signal propagation, and in particular relates to a nanomagnetic register for storing a signal.

BACKGROUND OF THE INVENTION

A nanometer-scale magnet, sometimes referred to as a nanomagnet, has a magnetization direction that can align along any of several magnetic axes in the nanomagnet. A nanomagnet can be created that has an easy axis, which is a relatively stable axis, and a hard axis, which is a less stable axis. A magnetization direction alignment in one direction along the easy axis of a nanomagnet can represent a first value, such as a zero, and a magnetization direction alignment in the other direction along the easy axis can represent a second value, such as a one. There has been success in propagating a signal along a series of nanomagnets.

In one technique, a force is applied to a series of nanomagnets to cause the magnetization direction of each nanomagnet to align along the hard axis of the nanomagnet. The force is removed, and the magnetization direction of a first nanomagnet in the series of nanomagnets is perturbed to cause the magnetization direction of the first nanomagnet to align in a particular direction along the easy axis of the nanomagnet. Magnetic dipole field coupling between adjacent nanomagnets ideally causes a cascade of magnetization direction easy axis alignments across the series of nanomagnets. Thus, assuming a reliable cascade of magnetization direction alignments along the series of nanomagnets, a signal can be propagated across the series of nanomagnets.

Methods and apparatus for creating nanomagnetic logic circuits which enable logic operations to be implemented entirely in the magnetic domain are disclosed in U.S. patent application Ser. No. 12/131,669 entitled NANOMAGNETIC SIGNAL PROPAGATION AND LOGIC GATES, filed Jun. 2, 2008, which is hereby incorporated by reference herein in its entirety. In order to use an output of one nanomagnetic logic circuit as an input to a subsequent nanomagnetic logic circuit in a clocked sequential system, the output must be stored in some manner between clock cycles. Merely designating one of the signal propagating nanomagnets at the end of a logic circuit as a register nanomagnet is problematic because the force that is applied to the nanomagnetic logic circuits to force the nanomagnets into hard axis alignment would also destroy the output signal (i.e., magnetization direction) of the register nanomagnet. One alternative is to convert the output signal from the magnetic domain to the electronic domain at the end of a clock cycle, and convert the output signal back from the electronic domain to the magnetic domain at the beginning of the next clock cycle. However, energy conversions require additional power and add delay that is inherent in such processes. Therefore, there is a need for a mechanism for storing the output of a nanomagnetic logic circuit in the magnetic domain.

SUMMARY OF THE INVENTION

The present invention relates to a nanomagnetic flip-flop, or register. The nanomagnetic register receives a signal from an incoming signal nanomagnet on a first clock cycle, and provides the input to an outgoing signal nanomagnet on a second clock cycle. The incoming signal nanomagnet and the outgoing signal nanomagnet are arranged on a substrate. Each of the signal nanomagnets has an easy axis and a hard axis that are in substantially the same plane, referred to herein as the signal plane. A register nanomagnet is arranged on the substrate between the incoming signal nanomagnet and the outgoing signal nanomagnet. The register nanomagnet has an easy axis and a hard axis that are substantially in the same plane, referred to herein as the register plane. The register plane is not coplanar with the signal plane. The easy axis of the register nanomagnet is substantially parallel to the easy axes of the incoming signal nanomagnet and the outgoing signal nanomagnet.

The register nanomagnet is positioned in proximity to the incoming signal nanomagnet such that the magnetization direction of the incoming signal nanomagnet, when aligned along the easy axis, can perturb the magnetization direction of the register nanomagnet off a hard axis alignment. The register nanomagnet is also positioned in proximity to the outgoing signal nanomagnet such that the magnetization direction of the register nanomagnet, when aligned along the easy axis, can perturb the magnetization direction of the outgoing signal nanomagnet off a hard axis alignment.

A first force is applied substantially along the signal plane at a magnitude sufficient to force the magnetization directions of the incoming signal nanomagnet and the outgoing signal nanomagnet along their respective hard axes. The force is then removed, and the magnetization direction of the incoming signal nanomagnet is perturbed to change the magnetization direction to move from the hard axis to the easy axis of the incoming signal nanomagnet. The incoming signal nanomagnet may be perturbed by a dipole field of an immediately adjacent signal-carrying nanomagnet. For example, the incoming signal nanomagnet may be a nanomagnet at the output of a nanomagnetic logic circuit.

A second force is applied substantially along the register plane at a magnitude sufficient to force the magnetization direction of the register nanomagnet along its hard axis. Because the register plane is not coplanar with the signal plane, the second force does not force the magnetization direction of the incoming or outgoing signal nanomagnets to align along their respective hard axes. The second force is removed, and the magnetization direction of the incoming signal nanomagnet causes the magnetization direction of the register nanomagnet to move from the hard axis to the easy axis. The incoming signal nanomagnet is engineered to influence the register nanomagnet more than the outgoing signal nanomagnet. This can be accomplished, for example, by making the incoming signal nanomagnet larger than the outgoing signal nanomagnet or by placing the incoming signal nanomagnet closer to the register nanomagnet than the outgoing signal nanomagnet.

The first force is applied again substantially along the signal plane at a magnitude sufficient to force the magnetization direction of the incoming signal nanomagnet and the outgoing signal nanomagnet along their respective hard axes. Because the register plane is not coplanar with the signal plane, the first force does not force the magnetization direction of the register nanomagnet to align along its hard axis. The first force is then removed, and the magnetization direction of the register nanomagnet causes the magnetization direction of the outgoing signal nanomagnet to move from the hard axis to the easy axis. The outgoing signal nanomagnet may be an input nanomagnet to a second nanomagnetic logic circuit, for example.

According to one embodiment, the incoming signal nanomagnet has a hard axis that is more metastable than the outgoing signal nanomagnet. This small energy well can be tuned by changing the amount of biaxial anisotropy with respect to the uniaxial anisotropy in the incoming signal nanomagnet. One way to accomplish this is to fabricate the incoming signal nanomagnet to have a smaller aspect ratio than the outgoing signal nanomagnet. The extra stability along the hard axis of the incoming signal nanomagnet prevents back propagation of a signal from the register nanomagnet. Another method of increasing stability is by making the incoming signal nanomagnet physically larger than the outgoing signal nanomagnet. In addition to making the incoming signal nanomagnet more metastable along the incoming signal nanomagnet's hard axis, the dipole fringe field of the incoming signal nanomagnet will also have a relatively larger magnitude compared to the outgoing signal nanomagnet. The relatively larger magnitude of the dipole fringe field of the incoming signal nanomagnet with respect to the relatively smaller magnitude of the dipole fringe field of the outgoing signal nanomagnet also enables the incoming signal nanomagnet to more strongly influence the magnetization direction of the register nanomagnet than the outgoing signal nanomagnet, such that in the case of conflict between the incoming signal nanomagnet and the outgoing signal nanomagnet, the magnetization direction of the register nanomagnet is appropriately influenced by the incoming signal nanomagnet.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 7:
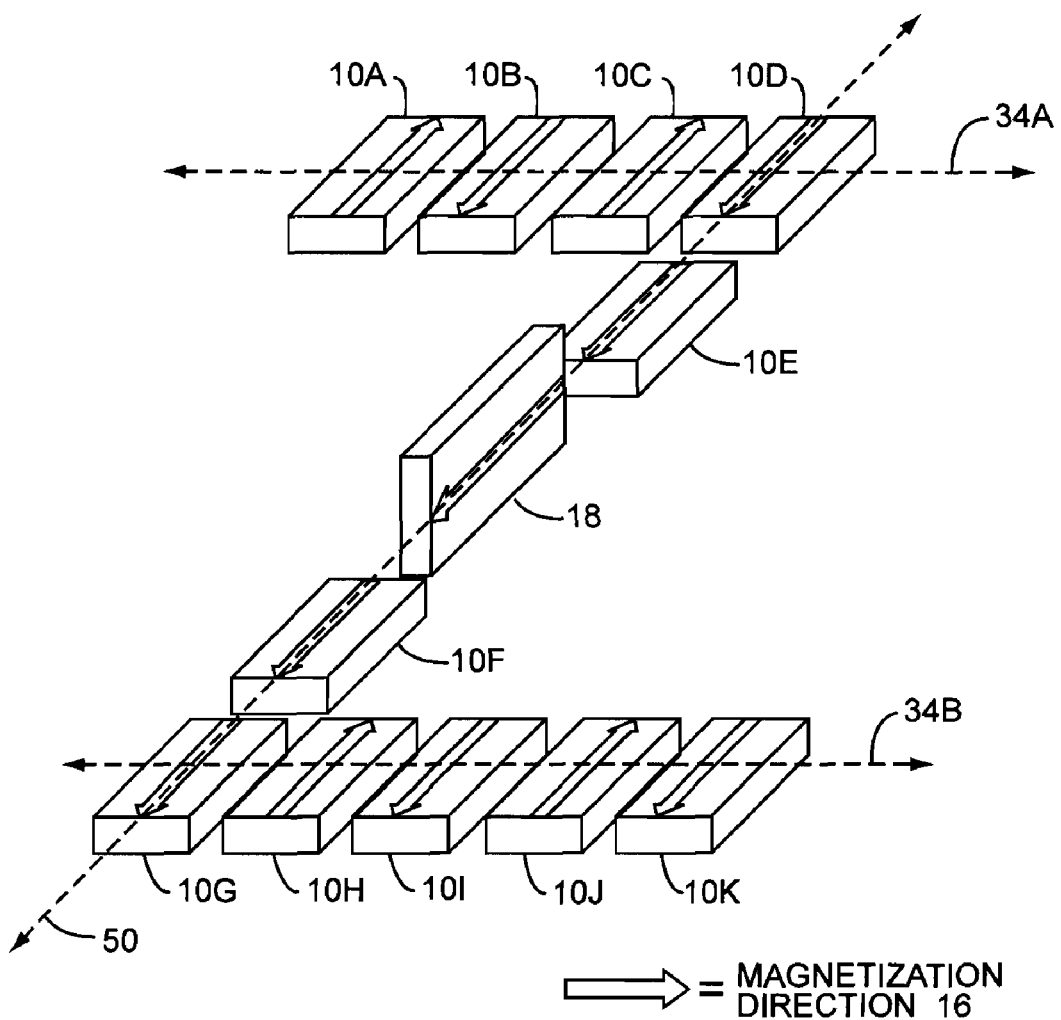
Figure 8:
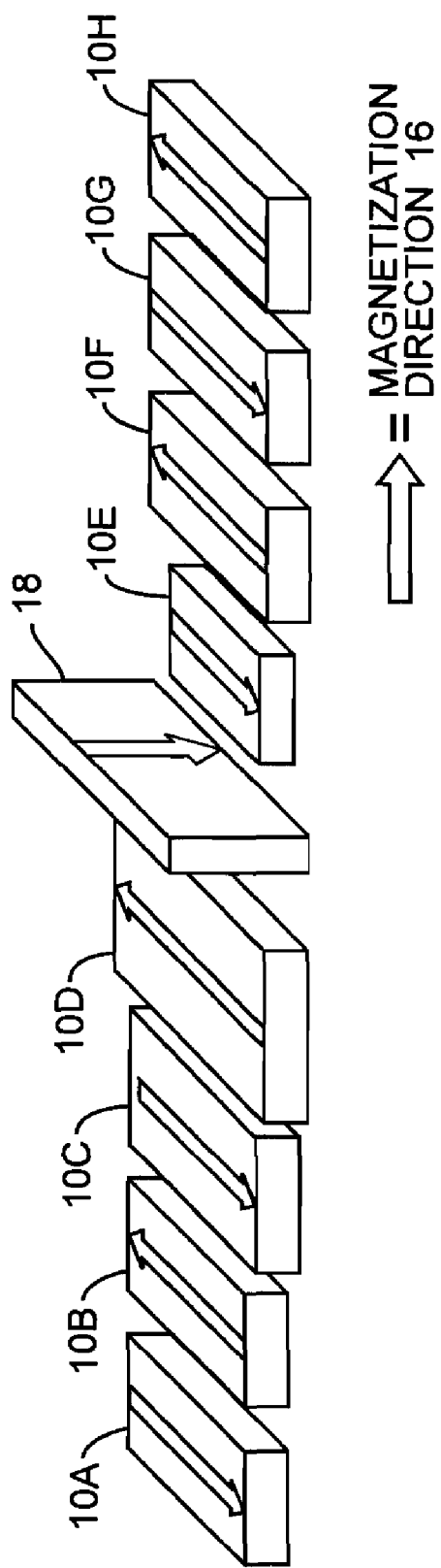
Figure 9:
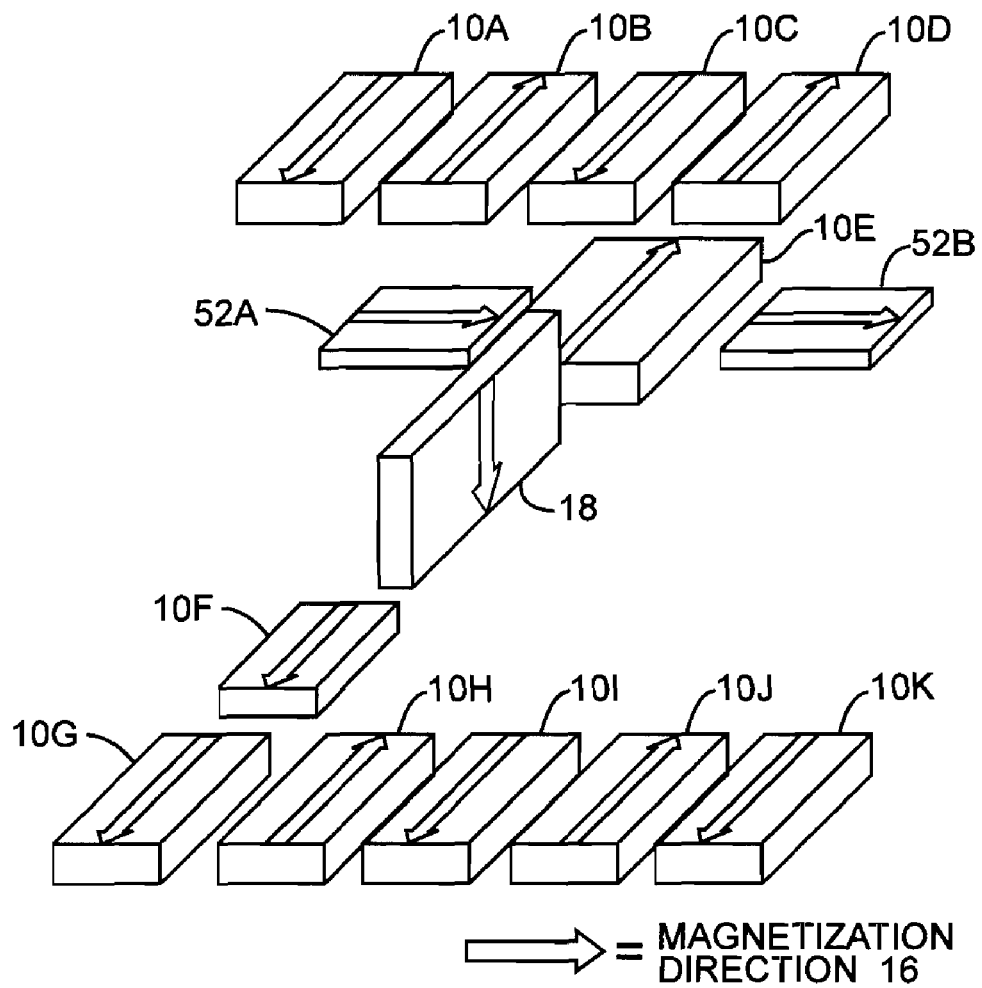

FIGS. 6a-f are block diagrams illustrating a register nanomagnet receiving a signal from incoming signal nanomagnets and providing a signal to outgoing signal nanomagnets;

FIG. 7 is a block diagram illustrating an exemplary series of signal nanomagnets and a register nanomagnet;

FIG. 8 is a block diagram illustrating another exemplary series of signal nanomagnets and a register nanomagnet; and FIG. 9 is a block diagram illustrating yet another exemplary series of signal nanomagnets and a register nanomagnet.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
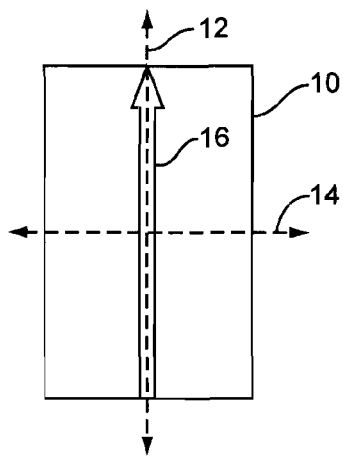
FIG. 1 is a block diagram of an exemplary nanomagnet.

FIG. 1 illustrates a nanomagnet 10 having an easy axis 12, a hard axis 14, and a magnetization direction 16. A nanomagnet 10 has a magnetic dipole defined by a dipole moment, which is a vector quantity having both a direction and a magnitude. As used herein, references to direction and/or magnetization direction refer to the direction component of the dipole moment associated with a respective nanomagnet. The magnetization direction of a nanomagnet 10 at a given instant in time will be illustrated throughout the Figures as an arrow in outline, as illustrated by the magnetization direction 16.

Generally, magnetic anisotropy relates to a direction dependence of a magnetic material. Due to a primary anisotropy characteristic, such as a uniaxial anisotropy characteristic, the magnetization direction 16 is inclined to align with, or along, the easy axis 12, because the magnetization energy of the nanomagnet 10 is at a lower energy state when the magnetization direction 16 is aligned along the easy axis 12 than when the magnetization direction 16 is not aligned along the easy axis 12. Thus, a nanomagnet 10 having a uniaxial anisotropy characteristic has an easy axis 12, defined by an energy minima along that easy axis 12, and a hard axis 14. A magnetization direction 16 can also be biased, induced, or otherwise forced to align along the hard axis 14, but stability is tenuous when so aligned because the magnetization energy of the nanomagnet 10 is higher than when aligned along the easy axis 12.

The uniaxial anisotropy characteristic typically has an associated uniaxial anisotropy term quantifying the magnetization energy of a nanomagnet 10 as a function of magnetization direction 16, according to approximately the following equation:

$$U(\theta)=E_{uniax}=K_u \cos 2(\theta), \quad (1)$$

wherein $\theta$ is the in-plane angle of the uniform magnetization direction 16 relative to the hard axis 14 in the absence of an external field, and $K_u$ is the uniaxial shape anisotropy constant. Where the uniaxial anisotropy characteristic is caused by shape anisotropy, the value of $K_u$ can be changed by altering the shape of the nanomagnet 10. U.S. patent application Ser. No. 12/131,669 entitled NANOMAGNETIC SIGNAL PROPAGATION AND LOGIC GATES, filed Jun. 2, 2008, discloses methods for forming a nanomagnet 10 having a metastable hard axis 14 through alignment of an easy axis 12 introduced by a biaxial anisotropy characteristic with the hard axis 14 introduced by the uniaxial anisotropy characteristic. In such a nanomagnet 10, the overall magnetization energy 'landscape' of the nanomagnet 10 can be approximately expressed in the following equation:

$$U(\theta)=K_u \cos^2(\theta)+\tfrac{1}{4}K_1 \sin^2(2\theta), \quad (2)$$

wherein $K_1$ is the biaxial anisotropy constant.

The magnetization energy of a respective nanomagnet 10 is at a higher energy level when the magnetization direction 16 is aligned along the hard axis 14 than when the magnetization direction 16 is aligned along the easy axis 12. For clarity, as described throughout this specification, nanomagnets are shown in a rectangular shape having a particular length, width, and height. However, nanomagnets may be formed in accordance with the present invention by mechanisms other than the use of shape anisotropy, including, for example, through magnetocrystalline anisotropy, strain anisotropy, and exchange biasing. The axis that runs parallel to the long dimension will be referred to herein as the easy axis, which is preferably a bistable axis, and the axis that runs perpendicular to the easy axis will be referred to herein as the hard axis, which is preferably a metastable axis. The axis that extends through the shortest dimension of the nanomagnets will be referred to herein as a 'very hard' axis to indicate that it requires a relatively significant force to force a magnetization direction to align along such axis.

Nanomagnets with biaxial anisotropy characteristics can be formed by, for example, epitaxially depositing cobalt onto a single-crystal copper substrate by molecular beam epitaxy. The resulting cobalt films can form with a face-centered cubic lattice, which exhibits biaxial anisotropy. Successful deposition of an epitaxial film, where there is a long-range order in the position of the atoms, relies on the film and the substrate having similar atomic spacings. Consequently, deposition of epitaxial magnetic films is not limited to cobalt nor is it limited to molecular beam epitaxy. Stress on a magnetic film is another mechanism for inducing biaxial anisotropy through magnetostriction effects.

Magnetization direction 16 can be used to represent data, including, for example, a binary one or zero. For purposes of illustration, as used herein, a magnetization direction 16 pointing upward along the easy axis 12 will be used to represent a binary one, and a magnetization direction 16 pointing downward along the easy axis 12 will be used to represent a binary zero. However, it will be apparent to those skilled in the art that other types of data could be represented via magnetization direction 16, and whether a particular direction represents a binary one or zero is arbitrary. Additionally, the Figures herein illustrate signal propagation along rows of nanomagnets as being generally left to right; however, the present invention is not limited to left to right signal propagation.

Figure 2A:
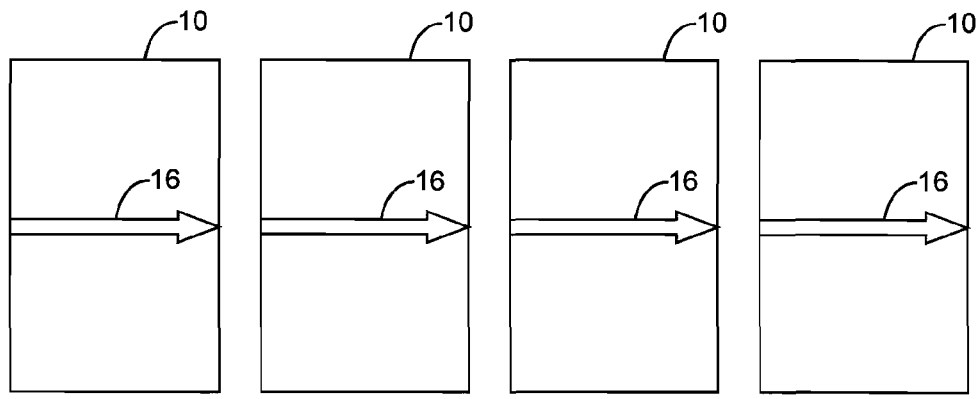
FIG. 2A is a block diagram illustrating a series of nanomagnets wherein the magnetization direction of each nanomagnet is in hard axis alignment.
Figure 2B:
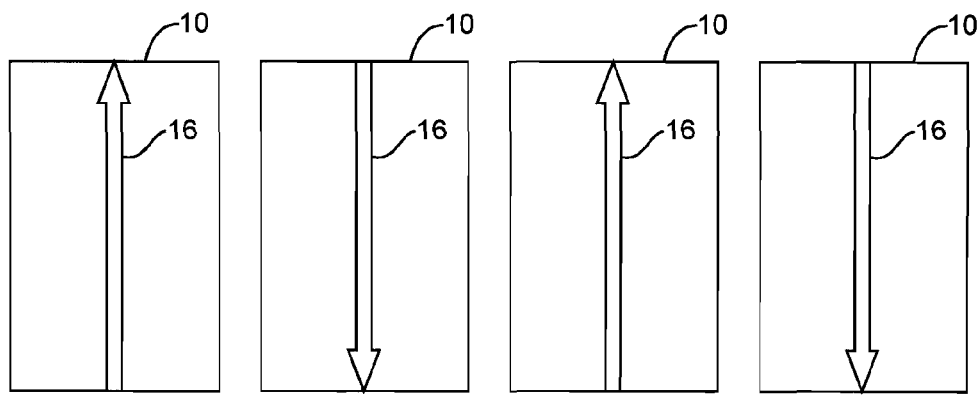
FIG. 2B is a block diagram illustrating signal propagation along the series of nanomagnets shown in FIG. 2A.

FIG. 2A illustrates a row of nanomagnets 10 having their magnetization directions 16 aligned along their respective hard axes. The term 'row' will be used herein to refer to an arrangement of nanomagnets 10 wherein the nanomagnets 10 are arranged a distance from one another and aligned along a line extending through their respective hard axes. The magnetization directions 16 may be forced into hard axis alignment in any manner suitable for inducing, biasing, or otherwise causing the magnetization directions 16 to align along the hard axis, including, for example, spin torque or the use of exchange coupling with a multi-ferroic layer. To ensure successful propagation of a signal when aligned in a row, the nanomagnets 10 are positioned a distance from one another such that dipole field coupling between adjacent nanomagnets 10 is sufficiently strong such that the movement of the magnetization direction 16 from hard axis alignment to easy axis alignment of one nanomagnet 10 causes an adjacent nanomagnet 10 that is in hard axis alignment to swing into anti-parallel easy axis alignment. By anti-parallel, it is meant that the magnetization direction 16 of each nanomagnet 10 points in the opposite direction of the magnetization direction 16 of an adjacent nanomagnet 10, as illustrated in FIG. 2B. For purposes of illustration, a nanomagnet 10 may be referred to as being in hard axis alignment or easy axis alignment, and it will be understood that such phrases mean that the magnetization direction 16 associated with the respective nanomagnet 10 is aligned with the hard axis, or easy axis, respectively.

While the invention will be described herein for purposes of illustration in the context of dipole field coupling between adjacent nanomagnets, the invention is not limited to dipole field coupling, and can be used with any coupling mechanism between nanomagnets that is suitable for perturbing a magnetic direction of a nanomagnet, including, for example, charge-current induced magnetization switching or charge-less pure spin-current-induced magnetization switching. Such mechanisms are described in T. Yang, T. Kimura, and Y. Otani, "Giant spin-accumulation signal and pure spin-current-induced reversible magnetization switching," Nature Physics, vol. 4, pp. 851-854, November 2008, the contents of which are hereby incorporated herein by reference.

U.S. patent application Ser. No. 12/131,669 also discloses methods and apparatus for creating nanomagnetic logic circuits which enable logic operations to be implemented entirely in the magnetic domain. However, in order for the output of a logic circuit to be useful in a finite state machine, such as a clocked sequential system wherein an output signal of a circuit from a previous clock cycle is an input to a circuit on a subsequent clock cycle, the output signal must be stored in a register between clock cycles. Because a biasing force is used to force each signal carrying nanomagnet into hard axis alignment at the beginning of each clock cycle in a nanomagnetic circuit, the output signal cannot be stored in a signal carrying nanomagnet. One alternative is to convert the output signal from the magnetic domain to the electronic domain at the end of a clock cycle, and convert the output signal back from the electronic domain to the magnetic domain at the beginning of the next clock cycle. However, energy conversions require additional power and add delay that is inherent in such conversion processes. According to one embodiment of the present disclosure, the output signal from a nanomagnetic logic circuit is stored in a nanomagnet 10 that is not forced into hard axis alignment by the bias force used to force the signal carrying nanomagnets into hard axis alignment. For purposes of illustration and explanation herein, such a nanomagnet will be referred to herein as a 'register' nanomagnet, while other nanomagnets will be referred to herein as 'signal' nanomagnets.

Figure 3:
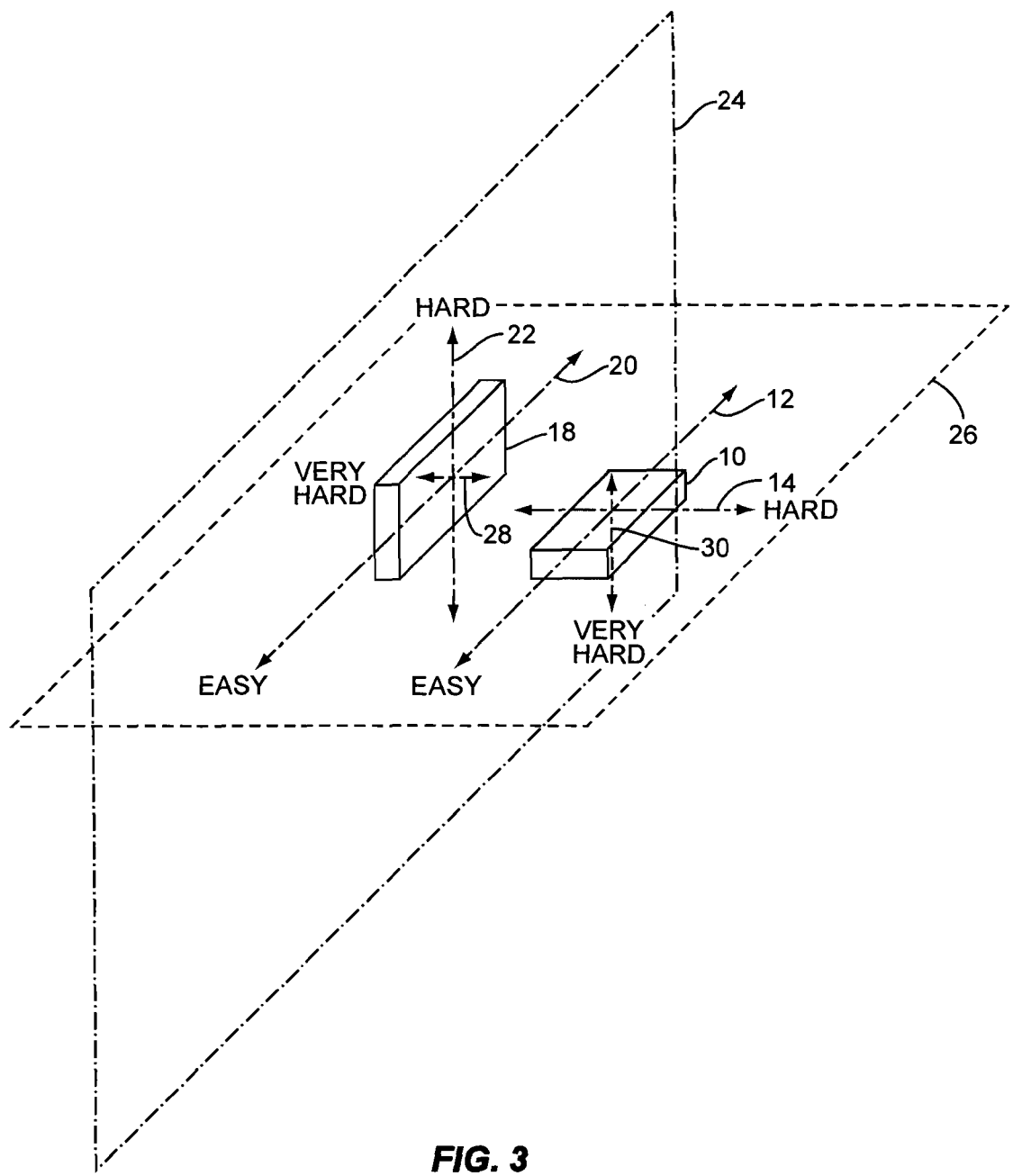
FIG. 3 is a block diagram illustrating various axes in an exemplary signal nanomagnet and an exemplary register nanomagnet.

FIG. 3 is a block diagram illustrating various axes in an exemplary signal nanomagnet 10 and an exemplary register nanomagnet 18. According to one embodiment, the register nanomagnet 18 has an easy axis 20 that is parallel to the easy axis 12 of the signal nanomagnet 10. The register nanomagnet 18 also has a hard axis 22. The easy axis 20 and the hard axis 22 of the register nanomagnet 18 are in substantially the same plane, as illustrated by plane 24. For purposes of illustration the plane 24 may be referred to herein as the "register" plane 24. The easy axis 12 and the hard axis 14 of the signal nanomagnet 10 are also in substantially the same plane, as illustrated by plane 26. For purposes of illustration, the plane 26 may be referred to herein as the "signal" plane 26. The register plane 24 is not coplanar with the signal plane 26.

Notably, the register nanomagnet 18 has a 'very hard' axis 28 in a direction parallel to the hard axis 14 of the signal nanomagnet 10. The very hard axis 28 is very unstable, and thus requires a relatively significant amount of force to force the magnetization direction of the register nanomagnet 18 to align along the very hard axis 28. The signal nanomagnet 10 also has a very hard axis 30 that is also very unstable, and thus requires a relatively significant amount of force to force the magnetization direction of the signal nanomagnet 10 to align along the very hard axis 30. Consequently, a biasing force along the register plane 24 can be chosen that is sufficient to force the register nanomagnet 18 into hard axis alignment but that will be insufficient to force the magnetization direction of the signal nanomagnet 10 into alignment along the very hard axis 30. Similarly, a biasing force along the signal plane 26 can be chosen that is sufficient to force the signal nanomagnet 10 into hard axis alignment but that will be insufficient to force the magnetization direction of the register nanomagnet 18 into alignment along the very hard axis 28. Note that while the register plane 24 is preferably substantially orthogonal to the signal plane 26, the present invention is not limited to such embodiments. According to another embodiment, the register plane 24 intersects the signal plane 26 at an angle between about 75 degrees and about 105 degrees. Note further that the signal nanomagnet 10 and the register nanomagnet 18 are shown as having a particular physical dimension with respect to one another; however, the present invention is not limited to nanomagnets of a particular physical shape, and can be implemented in nanomagnets of any size and shape that are constructed, manufactured, or otherwise engineered to have the axial properties described herein.

Figure 4:
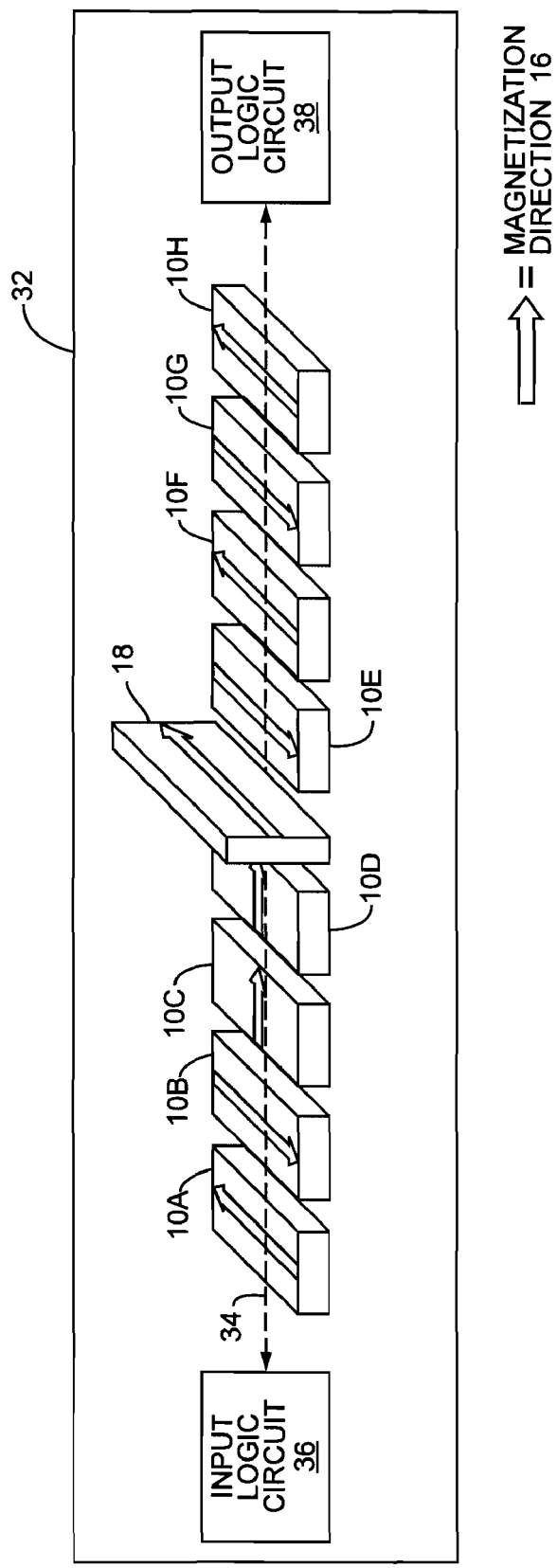
FIG. 4 is a block diagram illustrating exemplary signal propagation along a series of nanomagnets.

FIG. 4 is a block diagram illustrating exemplary signal propagation along a series of nanomagnets. A plurality of nanomagnets 10A-10H are arranged on a substrate 32, such as a single-crystal copper substrate, or a single crystal MgO substrate that permits sputtering of iron, for example. A particular signal nanomagnet 10D is immediately adjacent to the register nanomagnet 18, and will be referred to herein as the input signal nanomagnet 10D because it is the signal from the input signal nanomagnet 10D that sets the magnetization direction 16 of the register nanomagnet 18. A particular signal nanomagnet 10E is also immediately adjacent to the register nanomagnet 18, and will be referred to herein as the output signal nanomagnet 10E because the output signal nanomagnet 10E receives the signal from the register nanomagnet 18 for subsequent signal propagation.

An input logic circuit 36 is also arranged on the substrate 32 and can implement any desired logic. During a first clock cycle, the input logic circuit 36 provides a signal to the input signal nanomagnet 10D via a series of signal nanomagnets 10A-10C for storing in the register nanomagnet 18. During a second clock cycle, the register nanomagnet 18 provides the signal to the output signal nanomagnet 10E. The signal is then propagated along a series of signal nanomagnets 10E-10H to an output logic circuit 38.

FIG. 4 shows an exemplary orientation of magnetization directions 16 at a particular instant in time. The signal nanomagnets 10A-10H are arranged substantially linearly on the substrate 32 along a line 34 extending through the hard axis of each of the plurality of nanomagnets 10A-10H. The register nanomagnet 18 has a magnetization direction 16 pointing upward (i.e., representing a value of one), which was stored in the register nanomagnet 18 at the end of a previous clock cycle, During the current clock cycle, the register nanomagnet 18 provides the signal to the output signal nanomagnet 10E, which is adjacent to an edge of the register nanomagnet 18, and the signal propagates along the series of signal nanomagnets 10E-10H to the output logic circuit 38. During the current clock cycle, the input logic circuit 36 provides a new signal for storing in the register nanomagnet 18 that is currently propagating along the series of signal nanomagnets 10A-10C toward the input signal nanomagnet 10D, as shown by signal nanomagnets 10A and 10B being in easy axis alignment, while the signal nanomagnet 10C and the input signal nanomagnet 10D are still in hard axis alignment. Thus, the magnetization direction 16 of the signal nanomagnet 10C is, at the instant reflected in FIG. 4, being perturbed by the dipole fringe field of the signal nanomagnet 10B, and will next move into easy axis alignment with the magnetization direction 16 of the signal nanomagnet 10C pointing upwards, which will cause the magnetization direction 16 of the input signal nanomagnet 10D to point downwards. Note that the input signal nanomagnet 10D is adjacent to an edge of the register nanomagnet 18. Note also that the plurality of signal nanomagnets 10A-10H are arranged substantially linearly on the substrate 32 along the line 34 extending through the hard axis of each of the plurality of nanomagnets 10A-10H, and positioned such that a change in the magnetization direction 16 of one of the plurality of signal nanomagnets 10A-10H changes a magnetization direction 16 of an immediately adjacent signal nanomagnet 10 that is aligned along the hard axis.

Figure 5:
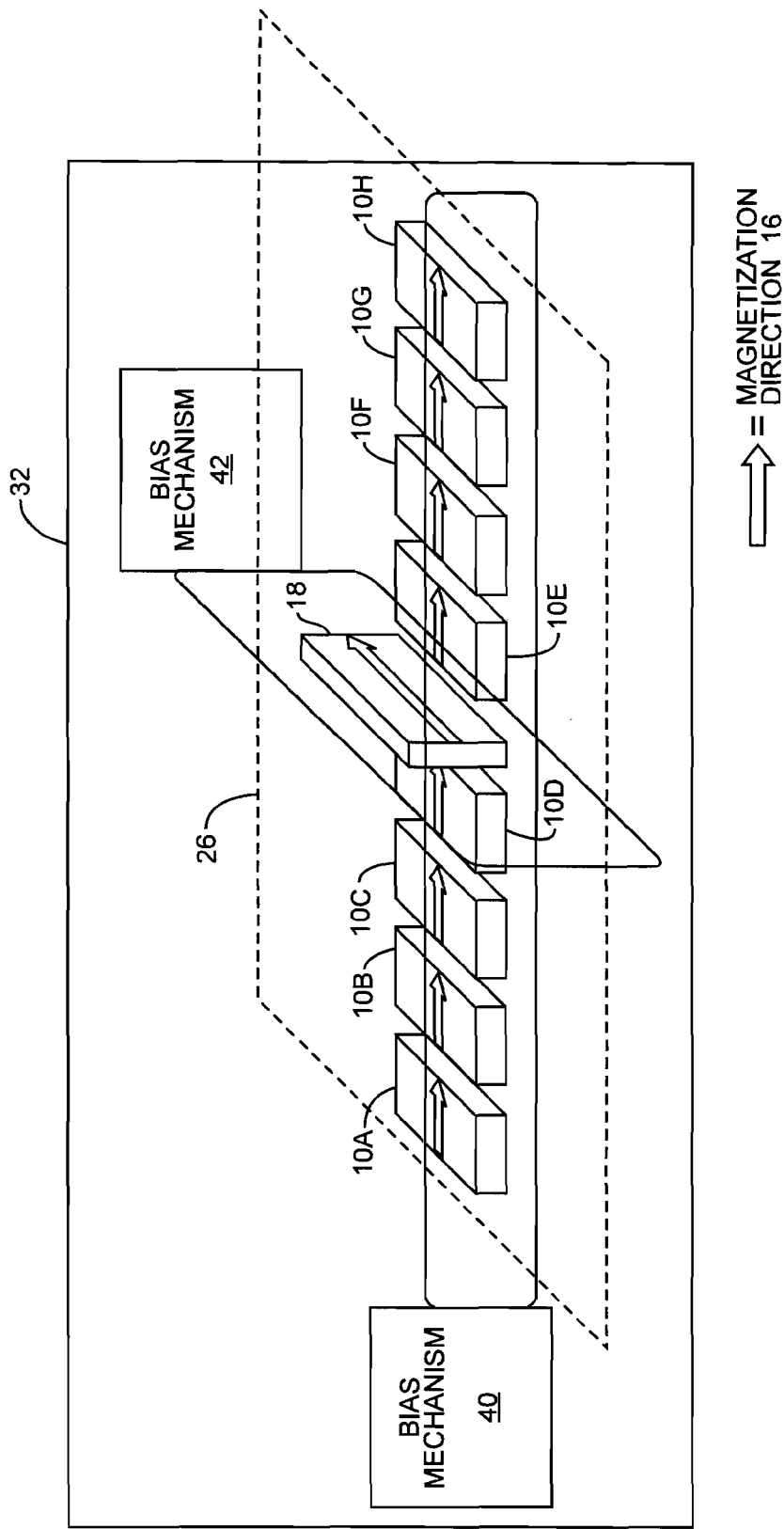
FIG. 5 is a block diagram illustrating bias mechanisms for forcing hard axis alignment in signal and register nanomagnets.

FIG. 5 is a block diagram illustrating bias mechanisms for forcing hard axis alignment in signal and register nanomagnets. A biasing apparatus, such as a bias mechanism 40, is mounted with respect to a surface of the substrate 32 and is adapted to apply a force along the signal plane 26 at a magnitude sufficient to force the magnetization direction 16 of each of the signal nanomagnets 10A-10H along the hard axis of each signal nanomagnet 10A-10H. Notably, because the force is applied along the signal plane 26 at a particular force, the force is insufficient to force the magnetization direction 16 of the register nanomagnet 18 off an easy axis alignment. A bias mechanism 42 is similarly adapted to apply a force along the register plane 24 (FIG. 3) at a magnitude sufficient to force the magnetization direction 16 of the register nanomagnet 18 into a hard axis alignment. Because the force is applied along the register plane 24 at a particular force, the force is insufficient to force the magnetization directions 16 of the signal nanomagnets 10A-10H off their respective easy or hard axis alignments. The bias mechanisms 40, 42 may comprise any mechanism suitable for biasing the respective nanomagnets, such as, for example, an external magnetic field generated through a buried wire, a permanent magnet, or multiferroic materials whose magnetic polarizations are coupled to their electric polarizations.

Figure 6:
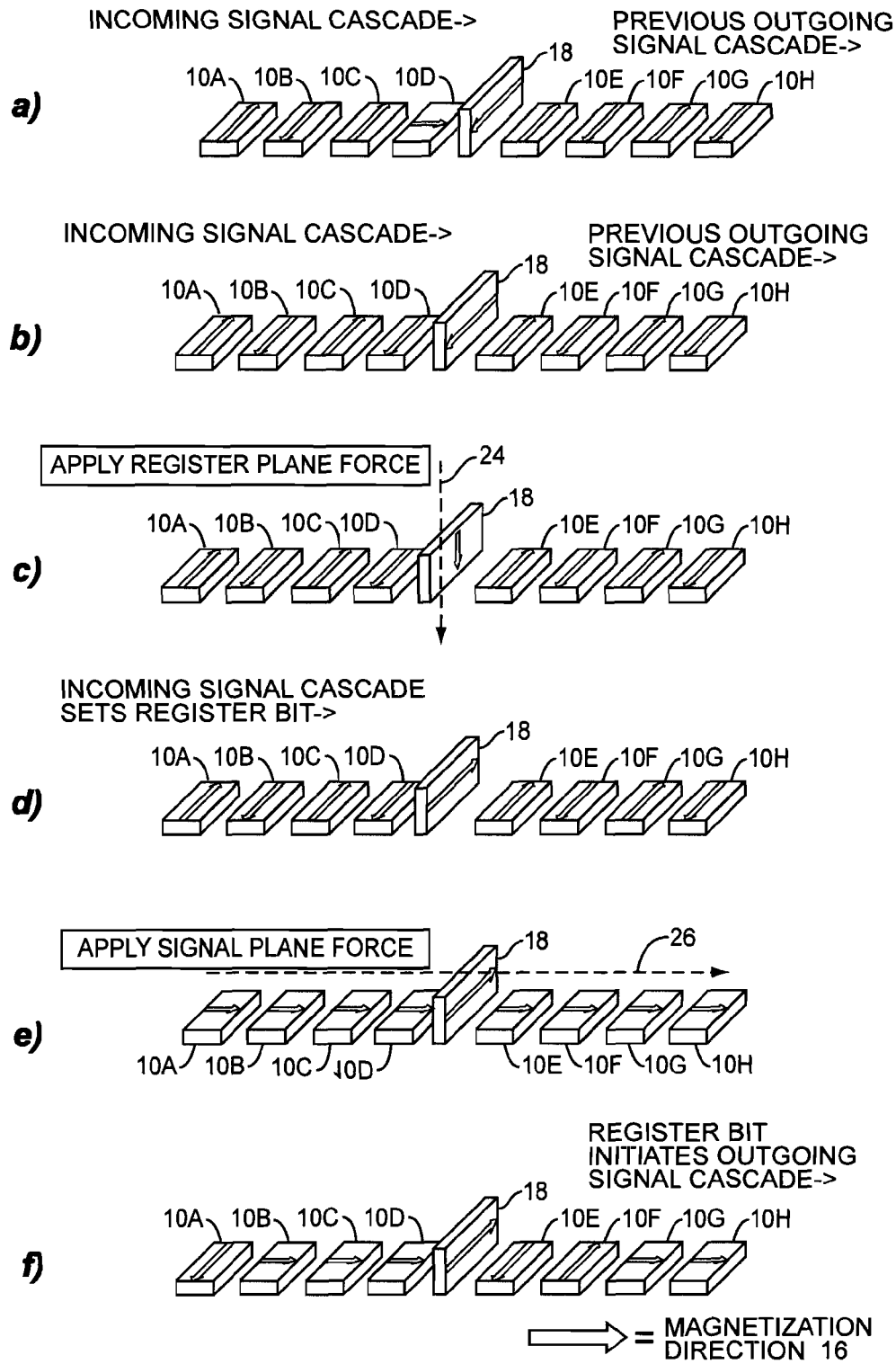

FIGS. 6a-6f are block diagrams illustrating an exemplary nanomagnet circuit at subsequent instances of time. Referring first to FIG. 6a, an incoming signal is being propagated along signal nanomagnets 10A-10D ultimately for storing in the register nanomagnet 18. The input signal nanomagnet 10D is receiving the signal from the signal nanomagnet 10C. The previous value stored in the register nanomagnet 18 is being propagated along the signal nanomagnets 10E-10F. Referring now to FIG. 6b, the input signal nanomagnet 10D has now received the signal from the signal nanomagnet 10C. Referring now to FIG. 6c, the bias mechanism 42 (FIG. 5) applies a force along the register plane 24 to force the magnetization direction 16 of the register nanomagnet 18 into hard axis alignment. Note that the application of the force along the register plane 24 does not cause a change in the magnetization direction 16 of the signal nanomagnets 10A-10H. Referring now to FIG. 6d, the force along the register plane 24 is removed, and the magnetization direction 16 of the input signal nanomagnet 10D perturbs the magnetization direction 16 of the register nanomagnet 18 so that the magnetization direction 16 of the register nanomagnet 18 aligns with the easy axis, in an anti-parallel alignment with the magnetization direction 16 of the input signal nanomagnet 10D.

Referring now to FIG. 6e, the bias mechanism 40 (FIG. 5) applies a force along the signal plane 26 to force the magnetization direction 16 of the signal nanomagnets 10A-10H into hard axis alignment. Note that the application of the force along the signal plane 26 does not cause a change in the magnetization direction 16 of the register nanomagnet 18. Referring now to FIG. 6f, the force along the signal plane 26 is removed, and the magnetization direction 16 of the output signal nanomagnet 10E is perturbed by the magnetization direction 16 of the register nanomagnet 18 via dipole field coupling, and swings into easy axis alignment in an anti-parallel relationship to the magnetization direction 16 of the register nanomagnet 18. The signal begins to propagate along the signal nanomagnets 10E-10H. Simultaneously, a new signal is being propagated along the signal nanomagnets 10A-10D.

FIG. 7 is a block diagram illustrating another exemplary arrangement of signal nanomagnets and a register nanomagnet. A plurality of signal nanomagnets 10A-10D are arranged substantially linearly along a line 34A extending through the hard axis of each of the plurality of signal nanomagnets 10A-10D. The output of the signal nanomagnet 10D is provided to the input signal nanomagnet 10E, which in turn sets the magnetization direction 16 of the register nanomagnet 18. The output signal nanomagnet 10F receives the signal from the register nanomagnet 18 and provides the signal to the signal nanomagnet 10G, where it is then propagated along the signal nanomagnets 10H-10K. Note that the signal nanomagnets 10D-10G and the register nanomagnet 18 are arranged substantially linearly along a line 50 extending through the easy axis of each of the plurality of signal nanomagnets 10D-10G and the register nanomagnet 18.

FIG. 8 is a block diagram illustrating an incoming signal nanomagnet that has a stronger dipole fringe field than an outgoing signal nanomagnet in a first arrangement. Two related issues may arise with use of a register nanomagnet according to embodiments of the invention. A first issue is referred to as back propagation of a signal. The dipole fringe field of the input signal nanomagnet 10D should be sufficiently strong to set the magnetization direction 16 of the register nanomagnet 18, but the dipole fringe field of the register nanomagnet 18 is preferably not strong enough with respect to the dipole fringe field of the input signal nanomagnet 10D to set the magnetization direction 16 of the input signal nanomagnet 10D. Thus, the input signal nanomagnet 10D preferably has a relatively larger dipole fringe field than the dipole fringe field of the register nanomagnet 18. One mechanism for increasing the magnitude of a dipole fringe field is to enlarge the size of the input signal nanomagnet 10D. Thus, according to one embodiment of the invention, the input signal nanomagnet 10D is preferably larger than other signal nanomagnets 10, such as the nanomagnets 10A-10C, to ensure the dipole fringe field of the input signal nanomagnet 10D is sufficient to prevent back propagation of the signal from the register nanomagnet 18. It may be desirable, or even necessary in certain circumstances, to provide a series of successively larger input nanomagnets 10 leading to the input signal nanomagnet 10D, as shown, for example, by the input nanomagnets 10B, 10C, and 10D, to ensure that the input signal nanomagnet 10D can be flipped by the signal nanomagnet 10C, and to ensure the input signal nanomagnet 10D has sufficient dipole field magnitude to prevent back propagation from the register nanomagnet 18.

A related issue arises when the bias mechanism 42 (FIG. 5) removes the force along the register plane 24. At that instant, the dipole fringe field of the input signal nanomagnet 10D and the dipole fringe field of the output signal nanomagnet 10E will both perturb and influence the magnetization direction 16 of the register nanomagnet 18. Where the magnetization direction 16 of the input signal nanomagnet 10D conflicts with the magnetization direction 16 of the output signal nanomagnet 10E, the register nanomagnet 18 should be more heavily influenced by the magnetization direction 16 of the input signal nanomagnet 10D than the magnetization direction 16 of the output signal nanomagnet 10E. Thus, the output signal nanomagnet 10E preferably has less metastability than the input signal nanomagnet 10D. One mechanism for increasing the metastability in the input signal nanomagnet 10D relative to the output signal nanomagnet 10E is to change the amount of biaxial anisotropy with respect to the uniaxial anisotropy of the input signal nanomagnet 10D, by, for example, fabricating the input signal nanomagnet 10D to have a smaller aspect ratio than the output signal nanomagnet 10E. Another mechanism is to make the input signal nanomagnet 10D physically larger than the output signal nanomagnet 10E. In addition to having more metastability, a larger input signal nanomagnet 10D will have a relatively larger magnitude dipole fringe field than the output signal nanomagnet 10E. Additionally or alternately, because the output signal nanomagnet 10E is the first nanomagnet in the series of nanomagnets 10E-10H, the output signal nanomagnet 10E may be manufactured without biaxial anisotropy, which will reduce the metastability of the output signal nanomagnet 10E.

FIG. 9 is a block diagram illustrating yet another exemplary series of signal nanomagnets and a register nanomagnet. In this arrangement, note that the input signal nanomagnet 10E and the output signal nanomagnet 10F are arranged substantially linearly along a line extending through the easy axis of the input signal nanomagnet 10E and the output signal nanomagnet 10F. The input signal nanomagnet 10E includes a pair of stabilizer nanomagnets 52A, 52B, which further stabilize the input signal nanomagnet 10E and further inhibit back propagation of a signal from the register nanomagnet 18. The stabilizer nanomagnets 52A, 52B can be formed in relatively square shapes to minimize shape-induced anisotropy. The biaxial anisotropy characteristic and the relatively large magnetic dipole moment render the stabilizer nanomagnets 52A, 52B relatively impervious to stray dipole fields from surrounding nanomagnets. Once their magnetization directions 16 are forced to align along the hard axis, the magnetization directions 16 of the stabilizer nanomagnets 52A, 52B remain pointing in the desired direction, increasing stability of the incoming signal nanomagnet 10E. U.S. patent application Ser. No. 12/131,669 includes further information regarding stabilizer nanomagnets, such as the stabilizer nanomagnets 52A, 52B.

Those skilled in the art will recognize improvements and modifications to the preferred embodiments of the present invention. All such improvements and modifications are considered within the scope of the concepts disclosed herein and the claims that follow.

What is claimed is:

1. A structure, comprising:
   a substrate;
   a plurality of nanomagnets on the substrate, each of the plurality of nanomagnets comprising a first easy axis and a first hard axis, wherein the plurality of nanomagnets are arranged substantially linearly on the substrate along a line extending through one of the first easy axis of each of the plurality of nanomagnets and the first hard axis of each of the plurality of nanomagnets, and wherein the first easy axis and the first hard axis of each of the plurality of nanomagnets are substantially in a first plane; and
   a register nanomagnet on the substrate adjacent to one of the plurality of nanomagnets and having a second easy axis and a second hard axis, wherein the second easy axis is parallel to the first easy axis and the second hard axis is in a second plane that is not coplanar with the first plane.

2. The structure of claim 1 wherein the plurality of nanomagnets are arranged with respect to one another wherein for each of the plurality of nanomagnets a change in magnetization direction of an immediately adjacent nanomagnet causes a change in magnetization direction of the respective nanomagnet when the respective nanomagnet is in hard axis alignment.

3. The structure of claim 1 wherein the plurality of nanomagnets are arranged substantially linearly on the substrate along a line extending through the first easy axis.

4. The structure of claim 1 wherein the plurality of nanomagnets are arranged substantially linearly on the substrate along a line extending through the first hard axis.

5. The structure of claim 1 further comprising a first bias apparatus mounted with respect to the substrate and adapted to apply a first force at a first magnitude sufficient to force a magnetization direction associated with each of the plurality of nanomagnets along the first hard axis of the respective each of the plurality of nanomagnets.

6. The structure of claim 5 further comprising a second bias apparatus mounted with respect to the substrate and adapted to apply a second force at a second magnitude sufficient to force a magnetization direction associated with the register nanomagnet along the second hard axis of the register nanomagnet.

7. The structure of claim 6 wherein the first magnitude is insufficient to force the magnetization direction associated with the register nanomagnet along the second hard axis of the register nanomagnet, and wherein the second magnitude is insufficient to force the magnetization direction associated with the plurality of nanomagnets along the first hard axis of the respective each of the plurality of nanomagnets.

8. The structure of claim 1 wherein the one of the plurality of nanomagnets is adjacent to a first edge of the register nanomagnet, and further comprising a second plurality of nanomagnets on the substrate, each of the second plurality of nanomagnets comprising a first easy axis and a first hard axis, wherein the second plurality of nanomagnets are arranged substantially linearly on the substrate along a line extending through one of the first easy axis of each of the second plurality of nanomagnets and the first hard axis of each of the second plurality of nanomagnets, and wherein the first easy axis and the first hard axis of each of the second plurality of nanomagnets are substantially in the first plane; and
one of the second plurality of nanomagnets is adjacent to a second edge of the register nanomagnet.

9. The structure of claim 8 wherein the one of the plurality of nanomagnets has a dipole field that is larger in magnitude than the one of the second plurality of nanomagnets.

10. The structure of claim 1 wherein the second easy axis and the second hard axis are in the second plane, and wherein the second plane is substantially perpendicular to the first plane.

11. A structure, comprising:
a substrate;
a plurality of nanomagnets on the substrate, each of the plurality of nanomagnets comprising a magnetization direction, a first easy axis, and a first hard axis, wherein the plurality of nanomagnets are arranged on the substrate such that a change in the magnetization direction of one of the plurality of nanomagnets changes a magnetization direction of an immediately adjacent nanomagnet that is aligned along the respective hard axis of the immediately adjacent nanomagnet, and wherein the first easy axis and the first hard axis of each of the plurality of nanomagnets are substantially in a first plane; and
a register nanomagnet on the substrate adjacent to one of the plurality of nanomagnets and having a second easy axis and a second hard axis, wherein the second easy axis is parallel to the first easy axis and the second hard axis is in a second plane that is not coplanar with the first plane.

12. The structure of claim 11 wherein the plurality of nanomagnets are arranged substantially linearly on the substrate along a line extending through the first easy axis.

13. The structure of claim 11 wherein the plurality of nanomagnets are arranged substantially linearly on the substrate along a line extending through the first hard axis.

14. The structure of claim 11 wherein one of the plurality of nanomagnets is adjacent to a first edge of the register nanomagnet, and further comprising a second plurality of nanomagnets on the substrate, each of the second plurality of nanomagnets comprising a magnetization direction, a first easy axis, and a first hard axis, wherein the second plurality of nanomagnets are arranged on the substrate such that a change in the magnetization direction of one of the second plurality of nanomagnets changes a magnetization direction of an immediately adjacent nanomagnet that is aligned along the respective hard axis of the immediately adjacent nanomagnet, and wherein the first easy axis and the first hard axis of each of the second plurality of nanomagnets are substantially in the first plane; and
one of the second plurality of nanomagnets is adjacent to a second edge of the register nanomagnet.

15. The structure of claim 14 wherein the one of the plurality of nanomagnets has a dipole field that is larger in magnitude than the one of the second plurality of nanomagnets.

16. The structure of claim 11 wherein the second easy axis and the second hard axis are in the second plane, and wherein the second plane is substantially perpendicular to the first plane.

17. A method for storing a signal in a nanomagnet comprising:
applying a first force at a first magnitude sufficient to force a magnetization direction of each of a plurality of nanomagnets arranged on a substrate along a hard axis associated with each respective nanomagnet;
removing the first force;
perturbing the magnetization direction of a first of the plurality of nanomagnets to change the magnetization direction of a first of the plurality of nanomagnets to move from the hard axis to an easy axis associated with the first of the plurality of nanomagnets, wherein the plurality of nanomagnets are arranged on the substrate such that a change in the magnetization direction of one of the plurality of nanomagnets changes a magnetization direction of an immediately adjacent nanomagnet that is aligned along the respective hard axis of the immediately adjacent nanomagnet;
applying a second force at a second magnitude sufficient to force a magnetization direction of a register nanomagnet arranged on the substrate along a hard axis associated with the register nanomagnet without changing the magnetization direction of one of the plurality of nanomagnets immediately adjacent to the register nanomagnet; and
removing the second force, wherein the magnetization direction of the one of the plurality of nanomagnets immediately adjacent to the register nanomagnet causes the magnetization direction of the register nanomagnet to move from the hard axis of the register nanomagnet to an easy axis of the register nanomagnet.

18. The method of claim 17 wherein applying the first force at the first magnitude further comprises applying the first force at the first magnitude sufficient to force the magnetization direction of each of the plurality of nanomagnets arranged on the substrate along the hard axis associated with each respective nanomagnet without changing the magnetization direction of the register nanomagnet.

19. The method of claim 17 wherein applying the first force at the first magnitude further comprises:
applying the first force at the first magnitude sufficient to force the magnetization direction of each of a second plurality of nanomagnets arranged on the substrate along the hard axis associated with each of the second plurality of nanomagnets, and wherein upon removing the first force, the magnetization direction of the register nanomagnet causes the magnetization direction of an adjacent one of the second plurality of nanomagnets to move from the hard axis to the easy axis of the register nanomagnet, and wherein the second plurality of nanomagnets are arranged on the substrate such that a change in the magnetization direction of one of the second plurality of nanomagnets changes a magnetization direction of an immediately adjacent nanomagnet that is aligned along the respective hard axis of the immediately adjacent nanomagnet.

20. A structure comprising:
an input signal nanomagnet having a first magnetization direction, a first easy axis, and a first hard axis, wherein the first easy axis and the first hard axis are in substantially a first plane;
an output signal nanomagnet having a second magnetization direction, a second easy axis, and a second hard axis, wherein the second easy axis and the second hard axis are in substantially the first plane; and
a register nanomagnet arranged between the input signal nanomagnet and the output signal nanomagnet having a third magnetization direction, a third easy axis, and a third hard axis, wherein the first easy axis, the second easy axis, and the third easy axis are parallel, and the third easy axis and the third hard axis are in a second plane that is not coplanar with the first plane.

21. The structure of claim 20 further comprising a biasing apparatus positioned with respect to a surface of the structure adapted to apply a force at a first magnitude sufficient to force the first magnetization direction and the second magnetization direction along the respective first hard axis and the second hard axis, without forcing the third magnetization direction along the third hard axis.

22. The structure of claim 21 further comprising a second biasing apparatus positioned with respect to the surface of the structure adapted to apply a second force at a second magnitude sufficient to force the third magnetization direction along the third hard axis without forcing the first magnetization direction and the second magnetization direction along the respective first hard axis and the second hard axis.

* * * * *